United States Patent [19]

Huttenlocher et al.

[11] Patent Number: 5,384,863
[45] Date of Patent: Jan. 24, 1995

[54] METHODS AND APPARATUS FOR AUTOMATIC MODIFICATION OF SEMANTICALLY SIGNIFICANT PORTIONS OF A DOCUMENT WITHOUT DOCUMENT IMAGE DECODING

[75] Inventors: Daniel P. Huttenlocher, Ithaca, N.Y.; Ronald M. Kaplan, Palo Alto; M. Margaret Withgott, Los Altos, both of Calif.; Todd A. Cass, Cambridge, Mass.; Per-Kristian Halvorsen, Los Altos, Calif.; Dan S. Bloomberg, Palo Alto, Calif.; Ramana B. Rao, San Francisco, Calif.

[73] Assignee: Xerox Corporation, Stamford, Conn.

[21] Appl. No.: 795,174

[22] Filed: Nov. 19, 1991

[51] Int. Cl.[6] .............................................. G06K 9/36
[52] U.S. Cl. ......................................... 382/9; 382/25; 382/40
[58] Field of Search ................... 382/9, 18, 25, 26, 40, 382/54, 55, 61

[56] References Cited

U.S. PATENT DOCUMENTS

| | | | |
|---|---|---|---|
| 4,581,710 | 4/1986 | Hasselmeier | 364/523 |
| 4,610,025 | 9/1986 | Blum et al. | 382/9 |
| 4,750,209 | 6/1988 | Shimura et al. | 382/9 |
| 4,908,716 | 3/1990 | Sakano | 358/453 |
| 4,985,930 | 1/1991 | Takeda et al. | 382/56 |
| 4,998,285 | 3/1991 | Suzuki et al. | 382/9 |
| 5,018,083 | 5/1991 | Watanabe et al. | 364/523 |
| 5,018,217 | 5/1991 | Yoshida et al. | 382/22 |
| 5,029,224 | 7/1991 | Fujisawa | 382/22 |
| 5,048,096 | 9/1991 | Beato | 382/9 |
| 5,048,109 | 9/1991 | Bloomberg et al. | 382/9 |
| 5,077,668 | 12/1991 | Doi | 364/419 |
| 5,138,465 | 8/1992 | Ng et al. | 358/153 |
| 5,289,169 | 2/1994 | Corfield et al. | 340/144 |

FOREIGN PATENT DOCUMENTS 385545 9/1990 European Pat. Off. ...... G06F 15/20

OTHER PUBLICATIONS

D. S. Bloomberg, "Multiresolution Morphological Approach to Document Image Analysis," first International Conference on Document Analysis and Recognition ICDAR 91, 30 Sep.–2 Oct. 1991, St. Malo, FR, pp. 963–971.

Y. Suenaga, "Some Techniques for Document and Image Preparation," System and Computers in Japan, vol. 17, No. 3, 1986, New York, pp. 35–46.

M. Hase et al., "A method for Extracting Marked Regions from Document Images," Systems & Computers in Japan, vol. 18, No. 8, 1987, New York, pp. 77–87.

Kopec G. E. et al., "Editing Images of Text," EP90 Proceedings of the International Conference on Electronic Publishing, Document Manipulation and Typography, Sep. 1990, Gaithersburg, pp. 207–220.

Baird et al., "Image Segmentation by Shape-Directed Covers," *Proceedings 10th International Conf. on Pattern Recog.*, vol. 1, 1990, pp. 820–825.

Fisher et al., "A Rule-Based System for Document Image Segmentation", *Proceedings 10th Int. Conf. on Pattern Recog.*, vol. 1, 1990, pp. 567–572.

Primary Examiner—Leo H. Boudreau
Assistant Examiner—Andrew W. Johns
Attorney, Agent, or Firm—Oliff & Berridge

[57] ABSTRACT

Methods and apparatus of processing an undecoded document image in a digital computer to modify the document image so as to emphasize semantically significant portions without first converting the document image to character codes. The document image is segmented into image units, and morphological image characteristics of the image units are evaluated to identify significant image units for emphasis. In one embodiment, the significant image units are emphasized by modifying at least one shape characteristic of the significant image units using at least one uniform morphological bitmap operation applied to the entire image unit bitmaps corresponding to the significant image units.

18 Claims, 15 Drawing Sheets

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la génération et l'utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 3

DÉTECTION ET LOCALISATION DES DÉFAUTS       79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la génération et l'utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 4

DÉTECTION ET LOCALISATION DES DÉFAUTS                               79 aux méthodes retenues doivent être *rassemblés* dans un même programme
ou polyalgorithme (groupement, en un seul programme, de plusieurs
algorithmes et d'un *programme* superviseur). De toutes façons, quelle que
soit sa forme, un programme d'aide au diagnostic doit posséder les carac-
téristiques suivantes :

*simplicité* : la *generation* et l'*utilisation* de la procédure de test doivent
   être faciles à mettre en œuvre et n'exiger de la part de l'ingénieur de
   *maintenance* ou de *contrôle* de qualité, *aucune* connaissance parti-
   culière sur les techniques et sur les langages de programmation;

*économique* : le *dépannage* ne doit pas coûter plus cher que le système
   testé;

*précis* : le test doit conduire aux composants ou sous-systèmes *défectueux*
   seuls responsables de la *panne*;

*complet* : tous les composants ou sous-systèmes élémentaires défectueux
   doivent pouvoir être identifiés.

5. CONCLUSION

Ce tour *d'horizon* sommaire conduit à conclure que le dépannage auto-
matique des circuits est encore à un stade embryonnaire. Deux grands
types d'études sont actuellement en cours.

FIG. 5

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la generation et l'utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 6

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la generation et l'utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 7

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la generation et l' utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne ;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 8

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la generation et l' utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne ;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 9

DÉTECTION ET LOCALISATION DES DÉFAUTS 79 aux méthodes retenues doivent être *rassemblés* dans un même programme ou polyalgorithme (groupement, en un seul programme, de plusieurs algorithmes et d'un *programme* superviseur). De toutes façons, quelle que soit sa forme, un programme d'aide au diagnostic doit posséder les caractéristiques suivantes :

*simplicité* : la *generation* et l' *utilisation* de la procédure de test doivent être faciles à mettre en œuvre et n'exiger de la part de l'ingénieur de *maintenance* ou de *contrôle* de qualité, *aucune* connaissance particulière sur les techniques et sur les langages de programmation;

*économique* : le *dépannage* ne doit pas coûter plus cher que le système testé;

*précis* : le test doit conduire aux composants ou sous-systèmes *défectueux* seuls responsables de la *panne* ;

*complet* : tous les composants ou sous-systèmes élémentaires défectueux doivent pouvoir être identifiés.

5. CONCLUSION

Ce tour *d'horizon* sommaire conduit à conclure que le dépannage automatique des circuits est encore à un stade embryonnaire. Deux grands types d'études sont actuellement en cours.

FIG. 10

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la génération et l'utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 11

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la génération et l'utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 12

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la génération et l'utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 13

DÉTECTION ET LOCALISATION DES DÉFAUTS 79 aux méthodes retenues doivent être rassemblés dans un même programme ou polyalgorithme (groupement, en un seul programme, de plusieurs algorithmes et d'un programme superviseur). De toutes façons, quelle que soit sa forme, un programme d'aide au diagnostic doit posséder les caractéristiques suivantes :

*simplicité* : la génération et l'utilisation de la procédure de test doivent être faciles à mettre en œuvre et n'exiger de la part de l'ingénieur de maintenance ou de contrôle de qualité, aucune connaissance particulière sur les techniques et sur les langages de programmation;

*économique* : le dépannage ne doit pas coûter plus cher que le système testé;

*précis* : le test doit conduire aux composants ou sous-systèmes défectueux seuls responsables de la panne;

*complet* : tous les composants ou sous-systèmes élémentaires défectueux doivent pouvoir être identifiés.

5. CONCLUSION

Ce tour d'horizon sommaire conduit à conclure que le dépannage automatique des circuits est encore à un stade embryonnaire. Deux grands types d'études sont actuellement en cours.

FIG. 14

DÉTECTION ET LOCALISATION DES DÉFAUTS 79 aux méthodes retenues doivent être *rassembles* dans un même programme ou polyalgorithme (groupement, en un seul programme, de plusieurs algorithmes et d'un *programme* superviseur). De toutes façons, quelle que soit sa forme, un programme d'aide au diagnostic doit posséder les caractéristiques suivantes :

*simplicité* : la *generation* et l'*utilisation* de la procédure de test doivent être faciles à mettre en œuvre et n'exiger de la part de l'ingénieur de *maintenance* ou de *controle* de qualité. *aucune* connaissance particulière sur les techniques et sur les langages de programmation;

*économique* : le *depannage* ne doit pas coûter plus cher que le système testé;

*précis* : le test doit conduire aux composants ou sous-systèmes *defectueux* seuls responsables de la *panne*;

*complet* : tous les composants ou sous-systèmes élémentaires défectueux doivent pouvoir être identifiés.

5. CONCLUSION

Ce tour *d'horizon* sommaire conduit à conclure que le dépannage automatique des circuits est encore à un stade embryonnaire. Deux grands types d'études sont actuellement en cours.

FIG. 15

METHODS AND APPARATUS FOR AUTOMATIC MODIFICATION OF SEMANTICALLY SIGNIFICANT PORTIONS OF A DOCUMENT WITHOUT DOCUMENT IMAGE DECODING

BACKGROUND OF THE INVENTION

Cross-References to Related Applications

The following concurrently filed and related U.S. patent applications are hereby cross referenced and incorporated by reference in their entirety.

"Method for Determining Boundaries of Words in Text" to Huttenlocher et al., U.S. patent application No. 07/794,392.

"Detecting Function Words Without Converting A Document to Character Codes" to Bloomberg et al., U.S. patent application No. 07/794,190.

"A Method of Deriving Wordshapes for Subsequent Comparison" to Huttenlocher et al., U.S. patent application No. 07/794,391.

"Method and Apparatus for Determining the Frequency of Words in a Document without Document Image Decoding" to Cass et al., U.S. patent application No. 07/795,173.

"Optical Word Recognition By Examination of Word Shape" to Huttenlocher et al., U.S. patent application No. 07/796,119.

"Method for Comparing Word Shapes" to Huttenlocher et al., U.S. patent application No. 07/795,169.

"Method and Apparatus for Determining the Frequency of Phrases in a Document Without Document Image Decoding" to Withgott et al., U.S. patent application No. 07/794,555.

1. Field of the Invention

This invention relates to improvements in methods and apparatuses for document image processing, and more particularly to improvements in methods and apparatuses for recognizing semantically significant portions of a document image and modifying the document image to emphasize the recognized portions without first decoding the document or otherwise understanding the information content thereof.

2. Background and References

It has long been the goal in computer based electronic document processing to be able, easily and reliably, to identify, access and extract information contained in electronically encoded data representing documents; and to summarize and characterize the information contained in a document or corpus of documents which has been electronically stored. For example, to facilitate review and evaluation of the information content of a document or corpus of documents to determine the relevance of same for a particular user's needs, it is desirable to be able to identify the semantically most significant portions of a document, in terms of the information they contain; and to be able to present those portions in a manner which facilitates the user's recognition and appreciation of the document contents. However, the problem of identifying the significant portions within a document is particularly difficult when dealing with images of the documents (bitmap image data), rather than with code representations thereof (e.g., coded representations of text such as ASCII). As opposed to ASCII text files, which permit users to perform operations such as Boolean algebraic key word searches in order to locate text of interest, electronic documents which have been produced by scanning an original without decoding to produce document images are difficult to evaluate without exhaustive viewing of each document image, or without hand-crafting a summary of the document for search purposes. Of course, document viewing or creation of a document summary require extensive human effort.

On the other hand, current image recognition methods, particularly involving textual material, generally involve dividing an image segment to be analyzed into individual characters which are then deciphered or decoded and matched to characters in a character library. One general class of such methods includes optical character recognition (OCR) techniques. Typically, OCR techniques enable a word to be recognized only after each of the individual characters of the word have been decoded, and a corresponding word image retrieved from a library.

Moreover, optical character recognition decoding operations generally require extensive computational effort, generally have a non-trivial degree of recognition error, and often require significant amounts of time for image processing, especially with regard to word recognition. Each bitmap of a character must be distinguished from its neighbors, its appearance analyzed, and identified in a decision making process as a distinct character in a predetermined set of characters. Further, the image quality of the original document and noise inherent in the generation of a scanned image contribute to uncertainty regarding the actual appearance of the bitmap for a character. Most character identifying processes assume that a character is an independent set of connected pixels. When this assumption fails due to the quality of the scanned image, identification also fails.

Further, one way of presenting selected portions of a scanned document image to the user is to emphasize those portions in some fashion in the document image. Heretofore, though, substantial modification of the appearance of a text image required relatively involved procedures.

REFERENCES

U.S. Pat. No. 4,581,710 to Hasselmeier describes a method of editing dot pattern data for character or image representations. For editing the data, a so called "window storage" is provided which assumes different positions from top to bottom of the page and allows editing at those positions.

U.S. Pat. No. 5,018,083 to Watanabe et al. describes an image processing system that inputs and edits image data. The system includes a parameter adding device to add output parameters to edit the image data and an edit control unit which can edit, as a headline, at least a part of the image data on the basis of the parameters added by the parameter adding device.

U.S. Pat. No. 5,029,224 to Fujisawa describes a marked region recognition apparatus. The apparatus comprises a storing means for storing detection results of the mark detection circuit for one line, a coordinate storing means for storing a coordinate in a main scanning direction where the marked region ends for each line, and recognition means for recognizing the marked region from the state of the marked region of the previous line stored in the two memory means. The apparatus recognizes an arbitrary marked region of a document image from an electronic mark signal, which indicates whether or not there exists a mark which indicates the marked region. The apparatus requires a marked region recognition circuit for implementation.

U.S. Pat. No. 4,908,716 to Sakano describes an image processing apparatus in which an area of a document is designated by a marking entered in the document and a portion encircled by the marking is treated as a marked area which is the subject of a trimming or a masking process. A color felt pen or the like is used to encircle a designated area of a document. Then, a mark detection circuit can detect the marking by detecting the tone of the image. The disparate reflectivity or tone of the marker pen allows marked area detection. Thereupon, the marked area can be erased or maintained as desired.

SUMMARY OF THE INVENTION

Accordingly, an object of the invention is to provide improved methods and apparatus for automatically emphasizing semantically significant portions of an undecoded document image without decoding the document image content.

It is another object of the invention to provide a method and apparatus of the type described that can be realized using a data processing system for performing data driven processing and which comprises execution processing means for performing functions by executing program instructions in a predetermined manner contained in a memory means.

It is another object of the invention to provide a simplified method and apparatus of the type described that enables the appearance of selected image units in a document to be altered using uniform morphological bitmap operations.

It is another object of the invention to provide a method and apparatus of the type described that can be used in conjunction with a digital document reproducing machine for changing or emphasizing selected portions of a document image.

In accordance with one aspect of the invention, a method of automatically emphasizing semantically significant portions of a document image is presented wherein the document image is segmented into image units without document image decoding and significant image units are identified in accordance with at least one predetermined significance criteria based on morphological (structural) image characteristics of the image units. The document image is then modified to emphasize the identified significant word units. The document image advantageously is generated, for example, by scanning an original printed document using an electrostatographic reproduction machine having means for scanning the document and producing an electronic representation of the image of the document.

However, the invention is not limited to systems utilizing document scanning. Rather, other systems such as bitmap workstations (i.e., a workstation with a bitmap display) or a system using both bitmapping and scanning would work equally well for implementation of the methods and apparatus as described herein. Also, the use of an electrostatographic reproduction machine as portrayed above is merely exemplary, whereas a document image can be scanned by any means available, or processed as a bitmap image.

The morphological image characteristics used to identify significant image units include image unit shape dimensions, typeface, font, location in the document image and frequency of image unit occurrence. In one embodiment, the significant image units are identified according to markings placed on the document by the user adjacent word units of interest to the user, such as encircling, underscore or other form of highlighting or emphasis.

The significant image units can be emphasized in any number of ways, for example, by generating an underline under each significant image unit, or by altering as least one shape characteristic of the significant image units. In accordance with one aspect of the invention, once the significant image units to be emphasized are identified, the entire image unit bitmap for a significant image unit is altered using at least one morphological operation to change at least one shape characteristic of the significant image units.

In accordance with another aspect of the invention, an apparatus for automatically processing a first document containing a word unit text to produce a second document in which semantically significant word units indicative of the subject matter content of the first document are emphasized is presented. The apparatus includes a means for processing a document image and producing an undecoded document image electronic representation of the document text, and a data processing system for performing data driven processing and which comprises execution processing means for performing functions by executing program instructions in a predetermined manner contained in a memory means. The program instructions operate the execution processing means to segment the document image into image units and to identify semantically significant image units in accordance with predetermined significance criteria based on morphological image characteristics of the image units, without decoding the document image. The program instructions further operate the data processing system to modify the bitmaps of the identified significant images so as to produce modified bitmaps which alter at least one shape characteristic of the identified significant image units.

These and other objects, features and advantages of the invention will be apparent to those skilled in the art from the following detailed description of the invention, when read in conjunction with the accompanying drawings and appended claims.

BRIEF DESCRIPTION OF THE DRAWINGS

Preferred embodiments of the invention are illustrated in the accompanying drawings, in which:

FIG. 3 shows an input document image where eleven words have been partially underlined by hand for processing by a bitmap operation in accordance with a preferred embodiment of the invention.

FIGS. 4–15 respectively show examples of output document images in which selected significant words have been emphasized by one or more bitmap operations in accordance with preferred embodiments of the invention.

DETAILED DESCRIPTION OF THE PREFERRED EMBODIMENT

In contrast to prior techniques, the invention is based in large measure upon the recognition that image files and character code files exhibit important differences for image processing, especially in data retrieval. The invention capitalizes on the visual properties of text contained in paper documents, such as the presence or frequency of linguistic terms (such as words of importance like "important", "significant", "crucial", or the like) used by the author of the text to draw attention to a particular phrase or a region of the text, font, type face information, formatting, and so on.

More particularly, the invention provides methods and apparatus for automatically emphasizing selected information within the data or text of a document image. The emphasized information may be words or phrases selected by a pre-determined selection criteria, depending upon the particular application in which the invention is employed. As those skilled in the art will appreciate, the emphasizing techniques of the invention are particularly well suited to be performed in applications such as using electrostatographic reproduction machines or printers, and may be performed to result in the production of an output paper document, for example, that has significant words or phrases in a document highlighted in the manner described below in detail.

Figure 1:
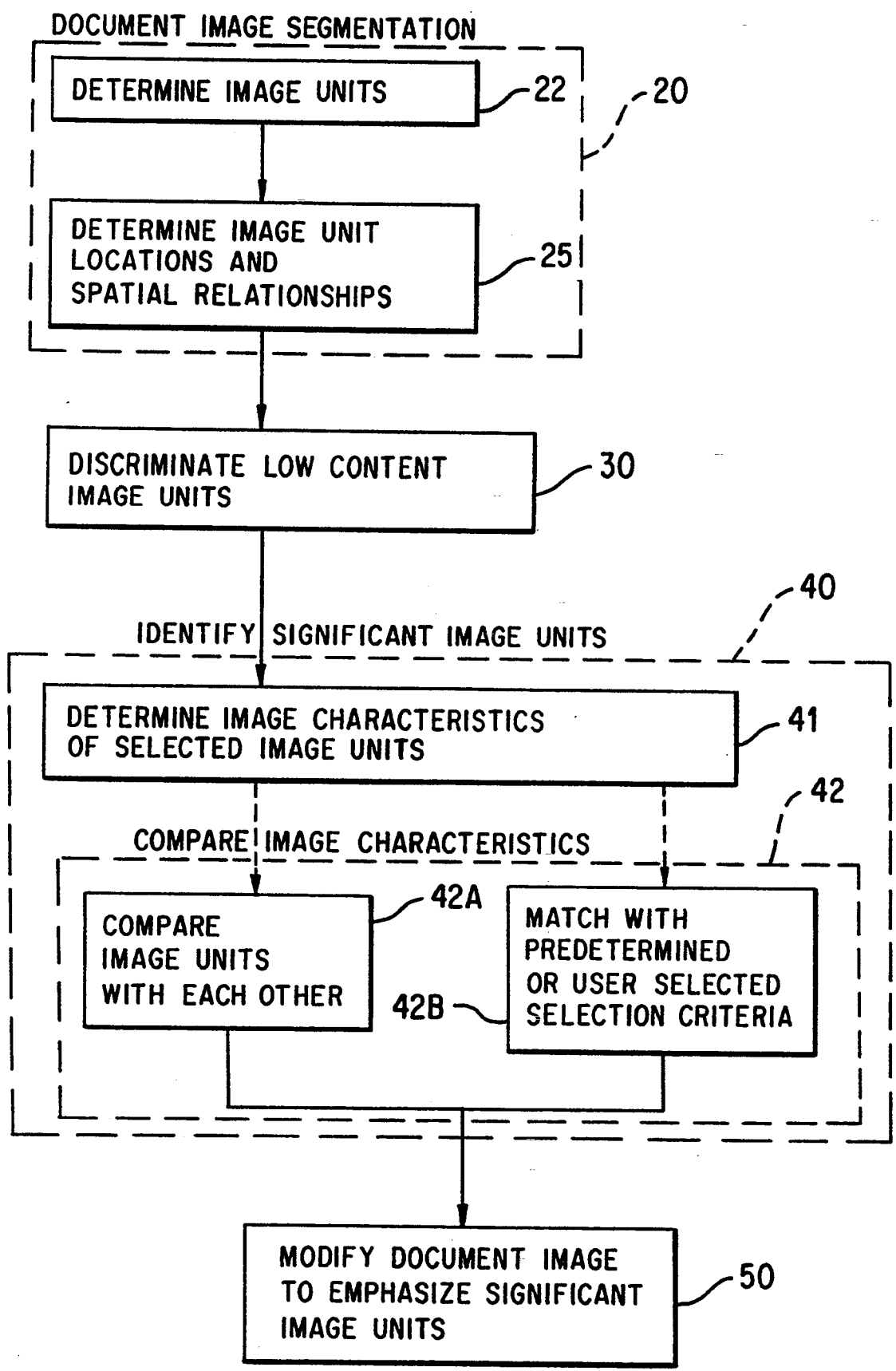
FIG. 1 is a flow chart of a method of a preferred embodiment of the invention for processing a document image to emphasize selected portions of the document image without first decoding the content of the document, or converting content to character codes.
Figure 2:
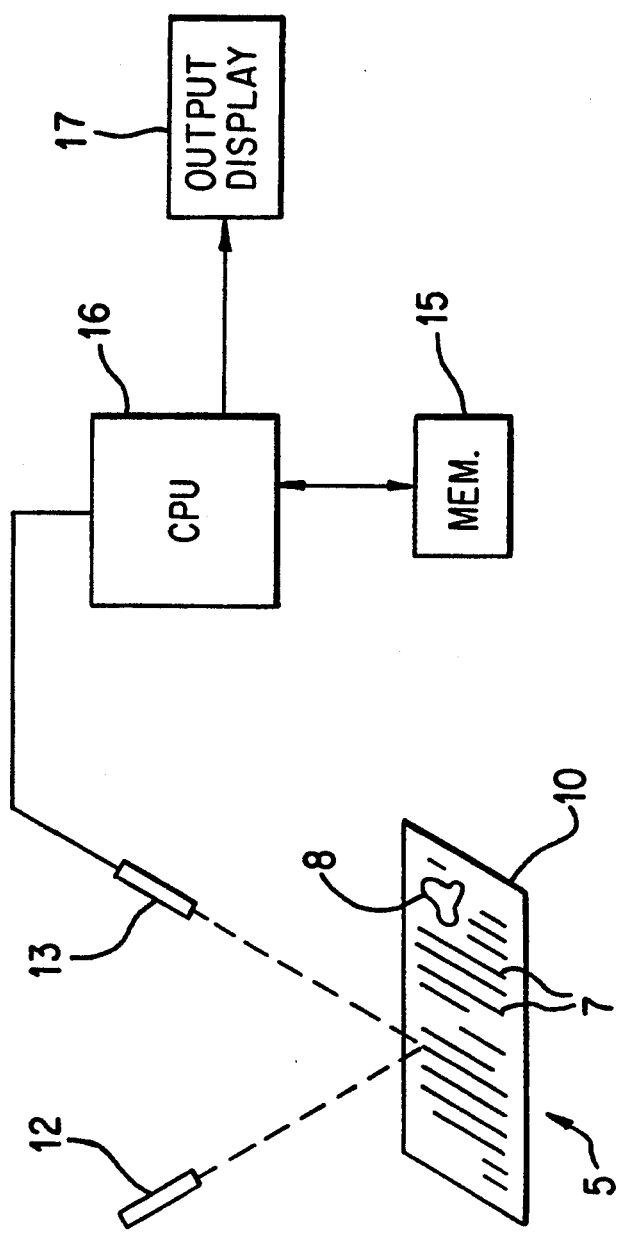
FIG. 2 is a block diagram of a preferred embodiment of apparatus according to the invention for performing the method of FIG. 1.

A preferred embodiment of the method of the invention is illustrated in the flow chart of FIG. 1, and apparatus for performing the method of FIG. 1 is shown in FIG. 2. For the sake of clarity, the invention will be described with reference to the processing of a single document. However, it will be appreciated that the invention is applicable to the processing of a corpus of documents containing a plurality of documents.

With reference first to FIG. 2, the method is performed on an electronic image of an original document 5, which may include lines of text 7, titles, drawings, FIGS. 8, or the like, contained in one or more sheets or pages of paper 10 or other tangible form. The electronic document image to be processed is created in any conventional manner, for example, by a scanning means, such as an optical scanner 12 and sensor 13 as shown, a copier machine scanner, a Braille reading machine scanner, an electronic beam scanner or the like. Such scanning means are well known in the art, and thus are not described in detail herein. (A bitmap workstation or a system using both bitmapping and scanning could also effectively be implemented).

An output derived from the scanner sensor 13 is digitized to produce bit mapped image data representing the document image for each page of the document, which data is stored, for example, in a memory 15 of a special or general purpose digital computer 16. The digital computer 16 can be of the type that performs data driven processing in a data processing system which comprises sequential execution processing means for performing functions by executing program instructions in a predetermined sequence, such computers now being well known in the art. The output from the computer 16 is delivered to an output device, such as, for example, a memory or other form of storage unit, or an output display 17 as illustrated, which may be, for instance, a photocopier, CRT display, printer, facsimile machine, or the like.

With reference now to FIG. 1, the first phase of the image processing technique of the invention involves a low level document image analysis in which the document image for each page is segmented into undecoded information containing image units (step 20) using conventional image analysis techniques; or, in the case of text documents, using, for example, the bounding box method described in copending U.S. patent application No. 07/794,392 filed concurrently herewith by Huttenlocher and Hopcroft, and entitled Method and Apparatus for Determining Boundaries of Words in Text.

Another method for finding word boxes is to close the image with a horizontal SE that joins characters but not words, followed by an operation that labels the bounding boxes of the connected image components (which in this case are words). The process can be greatly accelerated by using one or more threshold reductions (with threshold value 1), that have the effect both of reducing the image and of closing the spacing between the characters. The threshold reduction(s) are typically followed by a closing with a small horizontal SE. The connected component labeling operation is also done at the reduced scale, and the results are scaled up to full size. The disadvantage of operating at reduced scale is that the word bounding boxes are only approximate; however, for many applications the accuracy is sufficient. The described method works fairly well for arbitrary text fonts, but in extreme cases, such as large fixed width fonts that have large inter-character separation or small variable width fonts that have small inter-word separation, mistakes can occur. The most robust method chooses a SE for closing based on a measurement of specific image characteristics. This requires adding the following two steps:

(1) Order the image components in the original or reduced (but not closed) image in line order, left to right and top to bottom.

(2) Build a histogram of the horizontal intercomponent spacing. This histogram should naturally divide into the small inter-character spacing and the larger inter-word spacings. Then use the valley between these peaks to determining the size of SE to use for closing the image to merge characters but not join words.

After finding the bounding boxes or word boxes, the locations of and spatial relationships between the image units on a page can be determined (step 25). For example, an English language document image can be segmented into word image units based on the relative difference in spacing between characters within a word and the spacing between words. Sentence and paragraph boundaries can be similarly ascertained. Additional region segmentation image analysis can be performed to generate a physical document structure description that divides page images into labelled regions corresponding to auxiliary document elements like Figures, tables, footnotes and the like. Figure regions can be distinguished from text regions based on the relative lack of image units arranged in a line within the region, for example. Using this segmentation, knowledge of how the documents being processed are arranged (e.g., left-to-right, top-to-bottom), and, optionally, other inputted information such as document style, a "reading order" sequence for word images can also be generated. The term "image unit" is thus used herein to denote an identifiable segment of an image such as a number, character, glyph, symbol, word, phrase or other unit that can be reliably extracted. Advantageously, for purposes of document review and evaluation, the document image is segmented into sets of signs, symbols or other elements, such as words, which together form a unit of understanding. Such units of understanding are often characterized in an image as being separated by a spacing greater than that which separates the elements forming a unit. Such image units representing single units of understanding will be referred to hereinafter as "word units."

Advantageously, a discrimination step 30 is next performed to identify the image units which have insufficient information content to be useful in evaluating the subject matter content of the document being processed. Such image units include stop or function words, i.e., prepositions, articles and other words that play a largely grammatical role, as opposed to nouns and verbs that convey topic information. One preferred method is to use the morphological function word detection techniques disclosed in the copending U.S. patent application No. 07/794,190 filed concurrently herewith by Bloomberg et al., and entitled Detecting Function Words Without Converting A Scanned Document to Character Codes.

Next, in step 40, selected image units, e.g., the image units not discriminated in step 30, are evaluated, without decoding the image units being classified or reference to decoded image data, based on an evaluation of predetermined morphological (structural) image characteristics of the image units. The evaluation entails a determination (step 41) of the morphological image characteristics and a comparison (step 42) of the determined morphological image characteristics for each image unit either with the determined morphological image characteristics of the other image units, or with predetermined morphological image characteristics or morphological image characteristics selected by the user.

One preferred method for defining the image unit morphological image characteristics to be evaluated is to use the word shape derivation techniques disclosed in copending U.S. patent application No. 07/794,391 filed concurrently herewith by Huttenlocher and Hopcroft, and entitled A Method for Deriving Wordshapes for Subsequent Comparison. As described in that application, at least one, one-dimensional signal characterizing the shape of the word unit is derived; or an image function is derived defining a boundary enclosing the word unit, and the image function is augmented so that an edge function representing edges of the character string detected within the boundary is defined over its entire domain by a single independent variable within the closed boundary, without individually detecting and/or identifying the character or characters making up the word unit. As part of this process, baselines of the text on a page are determined (a baseline is a line extending under the non-descending characters on a text line). It will be appreciated that the ordering of the word units along the baselines, and the ordering of the baselines on each document image page provides the reading order of word units in the document image. It is noteworthy that the current invention compares undecoded words in a document and there is no implication that the undecoded words are to be compared, for instance, to the words in a lexicon.

The determined morphological image characteristic(s), e.g., the derived image unit shape representations, of each selected image unit are compared, as noted above (step 42), either with the determined morphological image characteristic(s)/derived image unit shape representations of the other selected image units (step 42A), or with predetermined/user-selected morphological image characteristics to locate specific types of image units (step 42B). The determined morphological image characteristics of the selected image units are advantageously compared with each other for the purpose of identifying equivalence classes of image units such that each equivalence class contains most or all of the instances of a given image unit in the document, and the relative frequencies with which image units occur in a document can be determined, as is set forth more fully in the copending U.S. patent application No. 07/795,173 filed concurrently herewith by Cass et al., and entitled Method and Apparatus for Determining the Frequency of Words in a Document with Document Image Decoding. Image units can then be classified or identified as significant according the frequency of their occurrence, as well as other characteristics of the image units, such as their length. For example, it has been recognized that a useful combination of selection criteria for business communications written in English is to select the most frequently occurring medium frequency word units, such as word units having a length corresponding to more that three and less than approximately eight characters.

It will be appreciated that the specification of the morphological image characteristics for titles, headings, captions, linguistic criteria or other significance indicating features of a document image can be predetermined and selected by the user to determine the selection criteria defining a "significant" image unit. Comparing the image characteristics of the selected image units of the document image for matches with the image characteristics associated with the selection criteria permits the significant image units to be readily identified without any document decoding.

Any of a number of different methods of comparison can be used. One technique that can be used, for example, is by correlating the raster images of the extracted image units using decision networks, such technique being described for characters in a Research Report entitled "Unsupervised Construction of Decision Networks for Pattern Classification" by Casey et al., IBM Research Report, 1984, incorporated herein in its entirety.

Preferred techniques that can be used to identify equivalence classes of word units are the word shape comparison techniques disclosed in U.S. patent application 07/796,119 and 07/795,169, filed concurrently herewith by Huttenlocher and Hopcroft, and by Huttenlocher, Hopcroft and Wayner, respectively, and entitled, respectively, "Optical Word Recognition By Examination of Word Shapes," and Method for Comparing Word Shapes.

Depending on the particular application, and the relative importance of processing speed versus accuracy, for example, evaluations of different degrees of precision can be performed. For example, useful evaluations can be based on length, width (height) or some other measurement dimension of the image unit (or derived image unit shape representation, e.g., the largest Figure in a document image); the location or region of the image unit in the document (including any selected Figure or paragraph of a document image, e.g., headings, initial Figures, one or more paragraphs or Figures), font, typeface, cross-section (a cross-section being a sequence of pixels of similar state in an image unit); the number of ascenders; the number of descenders; the average pixel density; the length of a top line contour, including peaks and troughs; the length of a base contour, including peaks and troughs; and combinations of such classifiers. As described in copending U.S. application No. 07/794,555 filed concurrently herewith by Withgott et al. and entitled "Method and Apparatus for Determining the Frequency of Phrases in a Scanned Document Without Document Image Decodings", it has been found that an adequate comparison for purposes of determining phrase frequency is to compare only the length and height of the derived image unit shape representations. Such a comparison is particularly fast, resulting in a highly efficient phrase frequency analysis which has proven to be sufficiently robust to reliably extract significant phrases in many text document applications.

In instances in which multiple page documents are processed, each page is processed and the data held in the memory 15 (see FIG. 1), as described above. The entirety of the data can then be processed.

The second phase of the document analysis according to both method embodiments of the invention involves further processing (step 50) of the scanned document image to emphasize the identified image units. The emphasis can be provided in numerous ways. One exemplary way is to augment the document image so that the identified significant image units are underscored, highlighted with color, or presented as margin notations.

Another exemplary way is to modify the shade and/or other appearance attributes of the significant image units themselves in a manner which emphasizes them relative to the other image units in the document image. The appearance modification can be accomplished using any conventional image modification techniques, or, advantageously, the following morphological bitmap modification techniques.

In accordance with the invention, one or more selected morphological operations are performed uniformly on the entire bitmap for a selected image unit to modify at least one shape characteristic thereof. It will be appreciated that the selection of bitmap operations may De performed automatically or interactively.

Examples of ways in which the appearance changes described above can be accomplished are as follows. The type style text can be "boldened" by either "dilation" or using a connectivity-preserving (CP) thickening operation. It can be "lightened" by either "erosion" or a CP thinning operation. (As will be appreciated by those skilled in the art, dilation and erosion are morphological operations which map a source image onto an equally sized destination image according to a rule defined by a pixel pattern called a structuring element (SE). A SE is defined by a center location and a number of pixel locations, each having a defined value (ON or OFF). The pixels defining the SE do not have to be adjacent each other. The center location need not be at the geometrical center of the pattern; indeed it need not even be inside the pattern. In a dilation, a given pixel in the source image being ON causes the SE to be written into the destination image with the SE center at the corresponding location in the destination image. The SEs used for dilation typically have no OFF pixels. In an erosion, a given pixel in the destination image is turned ON if and only if the result of superimposing the SE center on the corresponding pixel location in the source image results in a match between all ON and OFF pixels in the SE and the underlying pixels in the source image.)

Such dilation/thickening and erosion/thinning operations can be either isotropic (the same horizontally for vertically) or anisotropic (e.g., different in horizontal and vertical directions).

Although optical character recognition (OCR) techniques are required, for example, in order to convert the typestyle of a selected word unit to italic, a similar type of emphasis can be achieved through the morphological operation of horizontal shearing to achieve the slant typestyle. Slant is a variant of roman type style that is created from roman using a horizontal shear of about 12 degrees (this is the approximate slant angle of italic style characters). The sheared images can slant forwards, backwards, or even upwards, if desired. Text can also be bit inverted (black for white and vice versa) for emphasis, or words can be emphasized or de-emphasized by scaling up or down, respectively. In the case of scaling, it may also be desirable to change the thickness of the lines in the image unit in addition to simple scaling.

Thus, using such morphological bitmap alteration processes, hand marks such as underlining, side lining, circling, highlighting, and so forth, can be extracted from the image, and removed from the original bitmap by XOR operations. Removal of color highlight marks requires capture of a gray scale (or color) scanned image. Once captured, removal is relatively easy using the appropriate thresholding. The resulting image is similar in quality to that of un-highlighted marks. Words that are highlighted can be identified from the highlight mask and word boxes, using known seed-growing methods. The appearance of these words can be altered at will.

More particularly, an input document image is illustrated in FIG. 3 in which eleven words have been partially underlined by hand, the underlining representing a desired selection criteria for identifying words to be emphasized. The operations to be performed on the document image may be done automatically, without manual intervention, employing the techniques described above. Thus, for example, by processing the image units identified by the morphological operation techniques described above, a 3×3 dilation operation has been preformed on each of the image units to produce a boldening of the contents of the image units to enable an output document image to be formed as shown in FIG. 4.

Of course, other morphological operations can be used to provide emphasis or enhancement of the word units of the document image. For example, as shown in FIG. 5, an output document image can be generated in which the desired image units are slanted, using a horizontal shear of about 0.3 radian. It will be observed that the slanting that is produced is similar to but distinguishable from the slanting of the italic words which also appear in the document image. If desired, a backward horizontal shear may be utilized, so as to result in the output document image shown in FIG. 6.

In the example of FIG. 5, a vertical shrinking by a factor of about 0.8 of the selected words has been performed. The bitmap scale is unchanged in the horizontal direction, and the resulting bitmaps have been centered in the derived bounding boxes for the corresponding original word units. The selected word units may also be shrunk in a horizontal direction, as shown in FIG. 8, in which the emphasized word units have been shrunk by a factor of 0.8 of the selected word units. The bitmap scale is unchanged in the vertical direction. The resulting bitmaps have again been centered in the derived bounding boxes of the corresponding original word units. As shown in FIG. 9, the selected word units can be shrunk in both horizontal and vertical directions. In the particular output document image shown in FIG. 9, the emphasized word units have been shrunk by a factor of 0.8 in both horizontal and vertical directions, and, again, the resulting bitmaps have been centered in the bounding boxes of the corresponding original word units.

The bitmap operations can be used in combination; thus, as shown in FIG. 10, the bitmap has been rescaled in both horizontal and vertical directions by a factor of about 0.8, and, then, a horizontal shear of about 0.3 radian has been performed. Again, the resulting bitmaps are centered in the corresponding bounding boxes of the original word units.

Other types of emphasis can be also easily obtained. For example, as shown in FIG. 11, a vertical shear of 0.05 radian has been applied to the bitmap of each selected word unit. The resulting bitmaps have been centered in the bounding boxes of the corresponding original word units. Another example of emphasis operations is shown in FIG. 12 in which selected word units have been emphasized using two iterations of a horizontal connectivity-preserving thickening of a 4-connected, version 1 type. FIGS. 13 and 14 show the effects of two and three iterations, respectively, of the same connectivity-preserving thickening operation in both horizontal and vertical directions. Because the operations are CP, at least one OFF pixel separates adjacent characters. Consequently, the characters do not appear to merge together. The operations used in the examples of FIGS. 12-14 give a "gothic" appearance to the emphasized word units.

Finally, as shown in FIG. 15, selected words can be emphasized by being slanted as described above, and the pixels within the associated bounding box bit inverted, resulting in a negative image within the bounding box of the selected word units.

It will be appreciated that the morphological bitmap operations for image modification can be performed on image units selected in any manner, including not only the automatic methods described hereinabove for identifying significant image units based on the image characteristics thereof, but also using interactive methods based on notations, such as underlining, side lining, highlighting, "circling", and so on, made by the user either on the original document or the corresponding scanned document image. It will also be appreciated that the bitmaps which are altered need not be produced by scanning a printed document. They can be made by rendering from a page document language (pd1) or directly from interactive pen input.

It will therefore be appreciated that virtuality any user marking can be used to identify words for emphasis; for example, editing gestures, such as circling, underlining, or highlighting (with the use of appropriate gray or color scale thresholding means) can be converted to other marks. For example, an circle around a word unit can be removed and replaced by a machine line extending under the word. Or, a circle that denotes "delete" can be removed and replaced by a straight line crossing through the word.

On the other hand, region editing applications may be performed. For interactive editing display applications, the bitmap within a selected region (or, alternatively, the entire drawing canvas) can be altered. For example, all marks can be uniformly dilated to make them darker. They can also be thickened or thinned using an image connectivity-preserving operation; such connectivity-preserving operations are guaranteed neither to remove nor join individual components such as lines.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for electronically processing an undecoded electronic document image, comprising the steps of:

automatically segmenting the document image into image units having information content without decoding the document image, each of the image units comprising one of an undecoded word and an undecoded group of words;

identifying significant ones of said image units in accordance with selected morphological image characteristics without decoding the document image; and modifying said document image to emphasize the identified significant image units such that the significant image units are visually distinguishable from non-significant image units remaining in the document image.

2. The method of claim 1 wherein the step of identifying significant image units comprises classifying said image units according to frequency of occurrence.

3. The method of claim 1 wherein the step of identifying significant image units comprises classifying said image units according to location within the document image.

4. The method of claim 1 wherein said selected morphological image characteristics include image characteristics defining image units having predetermined linguistic criteria.

5. The method of claim 1 wherein said selected morphological image characteristics include at least one of an image unit shape dimension, font, typeface, number of ascender elements, number of descender elements, pixel density, pixel cross-sectional characteristic, the location of image units with respect to neighboring image units, vertical position, horizontal inter-image unit spacing, and contour characteristic of said image units.

6. The method of claim 1 wherein the step of identifying significant image units comprises identifying image units having an associated hand-drawn marking created by a user.

7. The method of claim 1 wherein the modifying step comprises modifying the appearance of the identified image units.

8. The method of claim 7 wherein the appearance modification of the identified image units comprises adding highlighting to the image units.

9. The method of claim 8 wherein the highlighting is in the form of an underscore.

10. The method of claim 7 wherein the appearance modification of the identified image units comprises modifying at least one shape characteristic of the image units.

11. The method of claim 10 wherein said document image comprises bitmap image data, the bitmap image data for an image unit defining an image unit bitmap, and the shape characteristic modification comprises performing a selected uniform morphological operation on the entire image unit bitmap for at least one of said identified image units to produce an altered image unit bitmap.

12. The method of claim 11 wherein a combination of uniform morphological operations are performed on the entire image unit bitmap for said at least one of said identified units.

13. The method of claim 11 wherein said selected uniform morphological operation is repeated with respect to said altered image unit bitmap to produce a further altered image unit bitmap.

14. Apparatus for automatically producing modified versions of an undecoded document image in which semantically significant portions are emphasized without document image decoding, comprising:

means for automatically segmenting the document image into image units without decoding the document image, each of the image units comprising one of an undecoded word and an undecoded group of words;

means for evaluating selected image units according to at least one morphological image characteristic thereof to identify significant image units without decoding the document image; and means for generating a modified version of the document image in which the identified significant image units are emphasized such that the significant image units are visually distinguishable from non-significant image units remaining in the document image.

15. The apparatus of claim 14 wherein said means for segmenting the document image, said means for identifying significant word units, and said means for generating a modified version of the document image comprise a programmed digital computer.

16. The apparatus of claim 14 comprising means for modifying the appearance of the significant image units.

17. The apparatus of claim 16, wherein said undecoded document image comprises bitmap image data, the bitmap image data for an image unit defining an image unit bitmap, and the means for modifying the appearance modifies at least one shape characteristic of the significant image units using at least one uniform morphological bitmap operation applied to the entire image unit bitmap for a significant image unit.

18. Apparatus for modifying the appearance of selected image units in an undecoded document image comprising bitmap image data, the bitmap image data for an image unit defining an image unit bitmap, said apparatus comprising:

means for automatically segmenting the document image into image units without decoding the document image, each of the image units comprising one of an undecoded word and an undecoded group of words;

means for identifying selected image units; and means for modifying at least one shape characteristic of the selected image units using at least one uniform morphological bitmap operation applied to the entire image unit bitmap for a selected image unit.

* * * * *